July 7, 1931.　　O. S. BOWMAN　　1,813,228

HEAT EQUIPMENT

Filed Dec. 19, 1929　　2 Sheets-Sheet 1

INVENTOR
Oliver S Bowman

July 7, 1931.  O. S. BOWMAN  1,813,228
HEAT EQUIPMENT
Filed Dec. 19, 1929  2 Sheets-Sheet 2
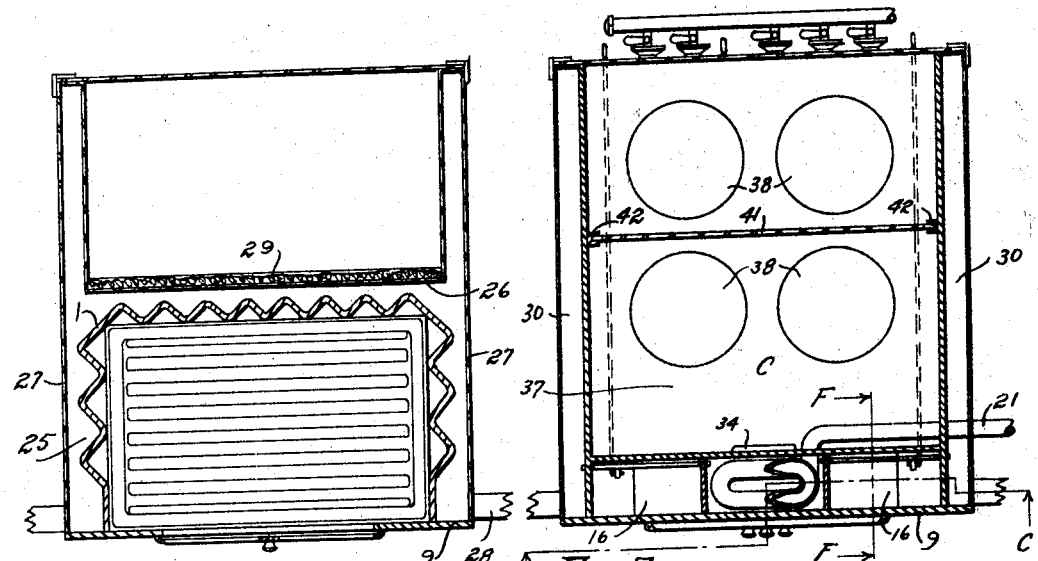
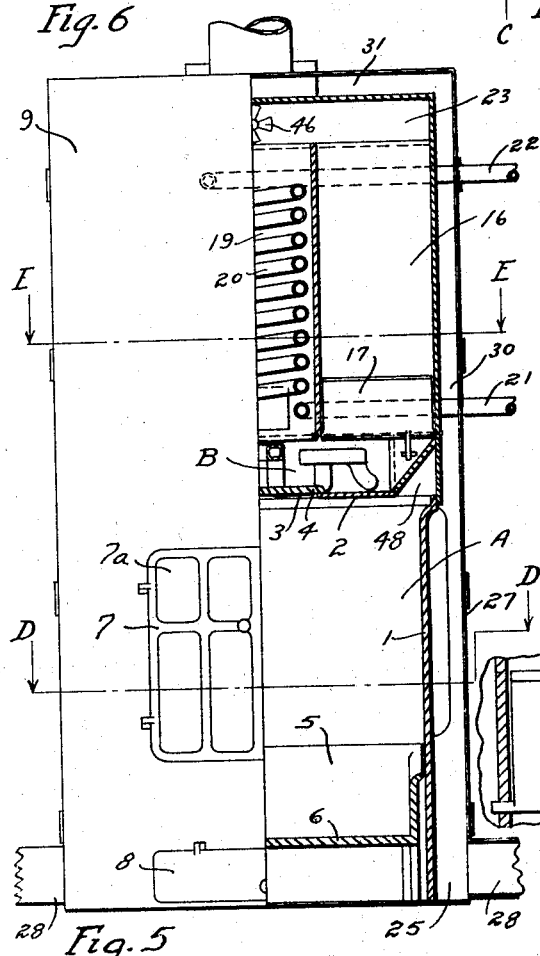
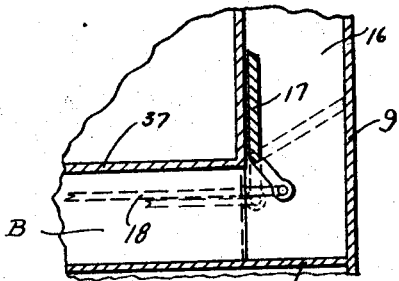
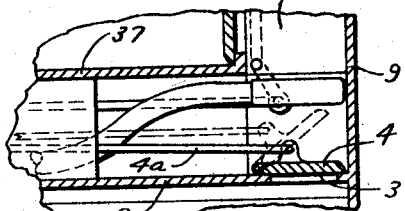
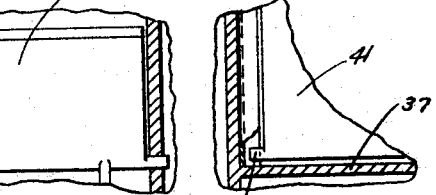
INVENTOR
Oliver S. Bowman Patented July 7, 1931

1,813,228

UNITED STATES PATENT OFFICE

OLIVER S. BOWMAN, OF COLORADO SPRINGS, COLORADO

HEAT EQUIPMENT

Application filed December 19, 1929. Serial No. 415,254.

My invention relates to warm air heat equipments, and my object is to provide a device which will require but one fire to provide warm air heat and heat by radiation, to cook, and to heat water for domestic use. Other objects will appear as the description progresses.

I attain these objects by the mechanism illustrated in the accompanying drawings, in which—

Figures 2, 4:
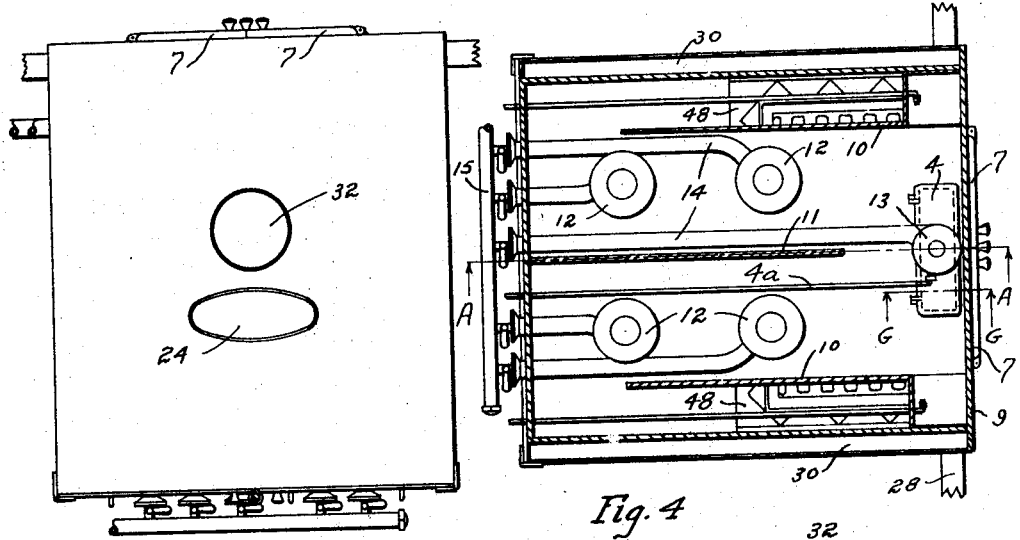
Figures 1, 3:
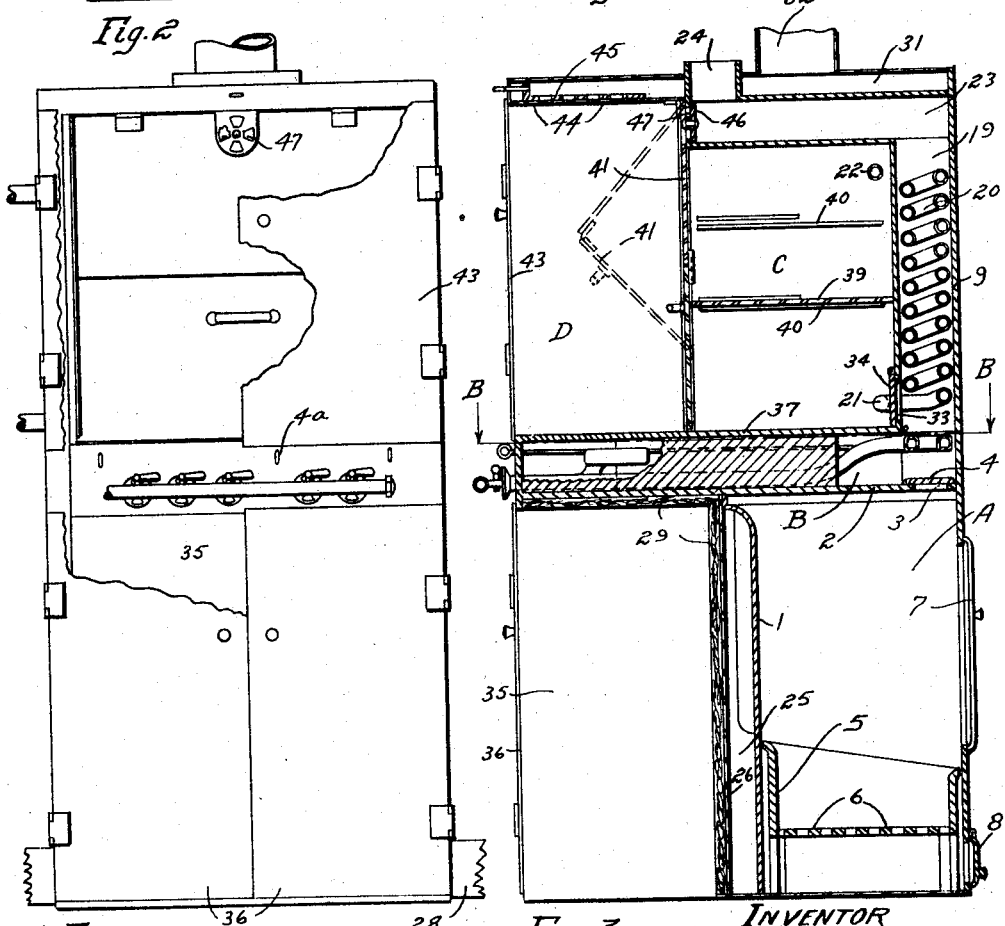

Figure 1 represents a rear elevation, partly broken away; Fig. 2, a plan view; Fig. 3, a sectional elevation, partly broken away, along the line A—A in Fig. 4; Fig. 4, a sectional plan view along the line B—B in Fig. 3; Fig. 5, a front elevation partly in section along the line C—C in Fig. 7; Fig. 6, a sectional plan view along the line D—D in Fig. 5; Fig. 7, a sectional plan view along the line E—E in Fig. 5; Fig. 8, an enlarged fragmentary sectional elevation along the line F—F in Fig. 7; Fig. 9, an enlarged fragmentary sectional elevation along the line G—G in Fig. 4; Fig. 10, an enlarged fragmentary front elevation, partly in section, of Fig. 8; Fig. 11, an enlarged fragmentary elevation, partly in section, showing details of construction of oven door.

Although I show the preferred embodiment of my invention, I do not confine myself to the precise form shown but wish it understood that various changes in the details of construction may be made, within the scope of the claims.

Like numerals refer to like parts throughout the drawings.

A combustion chamber A is enclosed on three sides by a vertically corrugated shell 1, and is partially covered by plate 2. Conduit 3 communicates with combustion chamber A, and is controlled by damper 4, provided with control rod 4a. A fire basket 5 containing grate bars 6 is disposed within said firebox. Fire doors 7, provided with transparent panes 7a, and draft door 8 are mounted on front radiating plate 9.

A horizontally disposed smoke chamber B, located between plate 2 and cooking plate 37 and provided with baffles 10—11, is in open communication, via openings 48 with and located above combustion chamber A.

Gas burners 12 and 13 are disposed within smoke chamber B and are provided with supply pipes 14 connected to gas pipe 15.

A pair of vertically disposed smoke channels 16 controlled by dampers 17, provided with control rods 18 communicate with smoke chamber B.

A vertically disposed smoke channel 19, located between smoke channels 16, contains water coil 20 provided with inlet pipe 21 and outlet pipe 22, and to which access is had via hand hole 33, normally closed by door 34.

A horizontally disposed smoke channel 23 communicates with smoke channels 16—19 and is provided with smoke outlet 24.

Air chamber 25 is formed by vertically corrugated shell 1, plate 26, the lower portions of plates 27 and the lower margins of radiating plate 9. Air inlet conduits 28 communicate with air chamber 25. Vertically disposed air channels 30 are in open communication with air chamber 25. Horizontally disposed air channel 31 is in open communication with air channels 30 and is provided with warm air outlet 32.

Insulation 29 is disposed adjacent to plates 2 and 26. Cabinet 35 is provided with doors 36. Cooking plate 37 is provided with holes, fitted with lids 38 and substantially concentric with gas burners 12.

Oven C, located above smoke chamber 3, behind smoke channels 16—19 and below smoke channel 23, is provided with removable grid 39 supported by cleats 40. Horizontally folding door 41 is hung from its upper edge, its lower edge being provided with a pair of horizontal projections 41a guided by channels 42.

Cooking compartment D, located behind oven C, is provided with doors 43.

Damper 45 controls communication via holes 44 between cooking compartment D and air channel 31.

Damper 46 controls communication via holes 47 between cooking compartment D and smoke channel 23.

Assuming that damper 4 is closed and that dampers 17 are open, the gases of combustion pass upward thru openings 48 into smoke chamber B, horizontally around baffles 10, upward thru smoke channels 16—19 into smoke channel 23 and out thru conduit 24 into a flue.

That portion of the gases of combustion passing upward thru smoke channel 19 is utilized to heat water in coil 20, for domestic purposes. The quantity of the gases of combustion flowing thru smoke channel 19 may be augmented by closing one or both dampers 17, and further augmented by opening damper 4, thereby permitting direct communication between combustion chamber A and smoke channel 19.

Air entering conduits 28 passes up thru air chamber 25, thru vertical air channels 30 to horizontal air channel 31 and thru conduit 32 to warm air registers. Heat is transferred to said air thru vertically corrugated shell 1, thru the inside walls of vertical air channels 30 and thru the lower wall of horizontal air channel 31.

Direct radiation occurs mainly thru front radiating plate 9, thru the outer walls of vertical air channels 30 and thru the upper wall of air channel 31.

Oven compartment C is heated thru cooking plate 37, thru the rear walls of smoke channels 16—19, and thru the lower wall of smoke channel 23. Grid 39 provides means for varying the location of utensils. Door 41 may be folded open, as indicated by dashed lines, to provide additional cooking surface when oven C is not in use.

Cooking compartment D is provided with enclosing doors 43. Holes 44, controlled by damper 45, provided communication between compartment D and horizontal air channel 31, permitting water vapor rising from any utensil on cooking plate 37 to enter the warm air stream, humidifying the warm air. Holes 47, controlled by damper 46, provide communication between compartment D and horizontal smoke channel 23, permitting odors arising from cooking to pass into the smoke stream.

If a direct draft is desired when starting a fire, dampers 17 are closed and damper 4 opened.

When warm air heat is not required, gas burners 12 may be used to heat cooking plate 37, and gas burner 13 may be used to heat water in coil 20. By closing dampers 17, any unused heat generated by burners 12 is caused to pass thru central smoke channel 19, thus heating water in coil 20.

Cabinet 35, provided with enclosing doors 36, provides storage space.

I claim:

1. In a heat equipment, the combination of a combustion chamber partially enclosed by a vertically corrugated shell, and provided with fire doors and a draft door; a horizontally disposed smoke chamber, provided with baffles, disposed above said combustion chamber; gas burners disposed within said smoke chamber and provided with supply pipes; a pair of vertically disposed, damper controlled, smoke channels communicating with said smoke chamber; a vertically disposed central smoke channel in open communication with said smoke chamber, disposed between said pair of smoke channels; a horizontally disposed smoke channel in open communication with said pair of smoke channels and with said central smoke channel, and provided with an outlet; and a damper controlled by-pass providing communication between said combustion chamber and said central smoke channel.

2. In a heat equipment, the combination of a combustion chamber partially enclosed by a vertically corrugated shell, and provided with fire doors and a draft door; a horizontally disposed smoke chamber, provided with baffles, disposed above said combustion chamber; gas burners disposed within said smoke chamber and provided with supply pipes; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; a damper controlled by-pass providing communication between said combustion chamber and said central smoke channel; and an opening, provided with a door, affording access to said central smoke channel.

3. In a heat equipment, the combination of a combustion chamber partially enclosed by a vertically corrugated shell, and provided with fire doors and a draft door; a horizontally disposed smoke chamber, provided with baffles, disposed above said combustion chamber; gas burners disposed within said smoke chamber and provided with supply pipes; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communciation with said pair of smoke channels and with said central smoke channel, and provided with an outlet; a damper controlled by-pass providing communication between said combustion chamber and said central smoke channel; an opening, provided with a door, affording access to said central smoke channel; and insulating material disposed adjacent to the rear wall of said air chamber and to the bottom wall of said horizontal smoke chamber.

4. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; a pair of vertically disposed, damper controlled, smoke channels communicating with said smoke chamber; a water coil, provided with inlet and outlet pipes, disposed within said central smoke channel; a horizontally disposed smoke channel in open communication with said pair of smoke channels, and with said central smoke channel, and provided with an outlet; a damper controlled by-pass providing communication between said combustion chamber and said central smoke channel; and insulating material disposed adjacent to the rear wall of said air chamber and to the bottom wall of said horizontal smoke chamber.

5. In a heat equipment, the combination of a combustion chamber partially enclosed by a vertically corrugated shell, and provided with fire doors and a draft door; an air chamber provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; a cooking compartment disposed above said smoke chamber; a damper controlled by-pass providing communication between said combustion chamber and said central smoke channel; and insulating material disposed adjacent to the rear wall of said air chamber and to the bottom wall of said horizontal smoke chamber.

6. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; gas burners disposed within said smoke chamber and provided with supply pipes; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; a cooking compartment disposed above said smoke chamber; a damper controlled by-pass providing communication between said combustion chamber and said central smoke channel; an opening, provided with a door affording access to said central smoke channel; and insulating material disposed adjacent to the rear wall of said air chamber and to the bottom wall of said horizontal smoke chamber.

7. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; gas burners disposed within said smoke chamber and provided with supply pipes; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; an oven compartment disposed above said smoke chamber; a cooking compartment disposed at the rear of said oven compartment and provided with doors; a damper controlled by-pass providing communication between said combustion chamber and said central smoke channel; a damper controlled opening providing communication between said cooking compartment and said horizontal air channel; a damper controlled opening providing communication between said cooking compartment and said horizontal smoke channel; an opening, provided with a door, affording access to said central smoke channel; and insulating material disposed adjacent to the rear wall of said air chamber and to the bottom wall of said horizontal smoke chamber.

8. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; gas burners disposed within said smoke chamber and provided with supply pipes; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; an oven compartment disposed above said smoke chamber and provided with a vertically hung sectional door having a pair of horizontal projections at its lower edge; a pair of vertically disposed channels engaging said projections; a cooking compartment disposed at the rear of said oven compartment and provided with doors; a damper controlled by-pass providing communication between said combustion chamber and said central smoke channels; a damper controlled opening providing communication between said cooking compartment and said horizontal air channel; a damper controlled opening providing communication between said cooking compartment and said horizontal smoke channel; an opening, provided with a door, affording access to said central smoke channel; and insulating material disposed adjacent to the rear wall of said air chamber and to the bottom wall of said horizontal smoke chamber.

9. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; gas burners disposed within said smoke chamber and provided with supply pipes; a storage compartment, provided with doors, disposed at the rear of said air chamber and below said smoke chamber; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; and oven compartment disposed above said smoke chamber and provided with a vertically hung sectional door having a pair of horizontal projections at its lower edge; a pair of vertically disposed channels engaging said projections; a cooking compartment disposed at the rear of said oven compartment and provided with doors; a damper controlled by-pass providing communication between said combustion chamber and said central smoke channel; a damper controlled opening providing communication between said cooking compartment and said horizontal air channel; a damper controlled opening providing communication between said cooking compartment and said horizontal smoke channel; an opening, provided with a door, affording access to said central smoke channel; and insulating material disposed adjacent to the rear wall of said air chamber and to the bottom wall of said horizontal smoke chamber.

10. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber a storage compartment, provided with doors, disposed at the rear of said air chamber and below said smoke chamber; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; an oven compartment disposed above said smoke chamber and provided with a vertically hung sectional door having a pair of horizontal projections at its lower edge; a pair of vertically disposed channels engaging said projections; a cooking compartment disposed at the rear of said oven compartment and provided with doors; a damper controlled by-pass providing communication between said combustion chamber and said central smoke channel; a damper controlled opening providing communication between said cooking compartment and said horizontal air channel; a damper controlled opening providing communication between said cooking compartment and said horizontal smoke channel; and insulating material disposed adjacent to the rear wall of said air chamber and to the bottom wall of said horizontal smoke chamber.

11. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; gas burners disposed within said smoke chamber and provided with supply pipes; a storage compartment, provided with doors, disposed at the rear of said air chamber and below said smoke chamber; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; an oven compartment disposed above said smoke chamber, and provided with a vertically hung sectional door having a pair of horizontal projections at its lower edge; a pair of vertically disposed channels engaging said projections; a cooking compartment disposed at the rear of said oven compartment and provided with doors; a damper controlled by-pass providing communication between said combustion chamber and said central smoke channel; an opening, provided with a door, affording access to said central smoke channel; and insulating material disposed adjacent to the rear wall of said air chamber and to the bottom wall of said horizontal smoke chamber.

12. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; gas burners disposed within said smoke chamber and provided with supply pipes; a storage compartment, provided with doors, disposed at the rear of said air chamber and below said smoke chamber; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; a cooking compartment disposed above said smoke chamber and provided with doors; a damper controlled by-pass providing communication between said combustion chamber and said central smoke channel; a damper controlled opening providing communication between said cooking compartment and said horizontal air channel; a damper controlled opening providing communication between said cooking compartment and said horizontal smoke channel; an opening, provided with a door, affording access to said central smoke channel; and insulating material disposed adjacent to the rear wall of said air chamber and to the bottom wall of said horizontal smoke chamber.

13. In a heat equipment, the combination of a combustion chamber partially enclosed by a vertically corrugated shell, and provided with fire doors and a draft door; an air chamber, provided with inlet conduits, partially surrounding said combustion chamber; vertically disposed air channels in open communication with said air chamber; a horizontally disposed air channel in open communication with said vertically disposed air channels, and provided with an outlet conduit; a horizontally disposed smoke chamber, provided with baffles, disposed above said combustion chamber; a pair of vertically disposed, damper controlled, smoke channels communicating with said smoke chamber; a vertically disposed central smoke channel in open communication with said smoke chamber, disposed between said pair of smoke channels; a water coil, provided with inlet and outlet pipes, disposed within said central smoke channel; a horizontally disposed smoke channel in open communication with said pair of smoke channels and with said central smoke channel, and provided with an outlet; a cooking compartment disposed above said smoke chamber and provided with doors; a damper controlled by-pass providing communication between said combustion chamber and said central smoke channel; a damper controlled opening providing communication between said cooking compartment and said horizontal air channel; a damper controlled opening providing communication between said cooking compartment and said horizontal smoke channel; and insulating material disposed adjacent to the rear wall of said air chamber and to the bottom wall of said horizontal smoke chamber.

OLIVER S. BOWMAN.